(12) United States Patent  (10) Patent No.: US 6,659,208 B2
Gaffney et al.                 (45) Date of Patent:    Dec. 9, 2003

(54) POWERED GOLF CADDY VEHICLE

(75) Inventors: Edward J Gaffney, Pewaukee, WI (US); John Daily, Sussex, WI (US); Ronald G Koehn, Waukesha, WI (US); Alan Zaremba, Delafield, WI (US)

(73) Assignee: Fairway Golf Cars, LLC, Waukesha, WI (US)

( * ) Notice: Subject to any disclaimer, the term of this patent is extended or adjusted under 35 U.S.C. 154(b) by 26 days.

(21) Appl. No.: 10/053,218

(22) Filed: Jan. 15, 2002

(65) Prior Publication Data

US 2003/0132047 A1 Jul. 17, 2003

(51) Int. Cl.[7] ............................................. B62D 51/04

(52) U.S. Cl. ................. 180/19.2; 180/19.3; 280/DIG. 5

(58) Field of Search ........................... 180/65.1, 13, 12, 180/19.1, 19.2, 19.3; 280/DIG. 5, DIG. 6

(56) References Cited

U.S. PATENT DOCUMENTS

| 3,648,795 | A | * | 3/1972 | Moulton | 180/27 |
|---|---|---|---|---|---|
| 4,106,583 | A | * | 8/1978 | Nemeth | 180/65 E |
| 4,356,875 | A | * | 11/1982 | Clune | 180/13 |
| 4,657,100 | A | * | 4/1987 | Lewis | 180/19.1 |
| 4,832,362 | A | * | 5/1989 | Chen | 280/645 |
| 4,848,504 | A | * | 7/1989 | Olson | 180/19.1 |
| 5,161,635 | A | * | 11/1992 | Kiffe | 180/193 |
| 5,307,889 | A | * | 5/1994 | Bohannan | 180/13 |
| 5,375,673 | A | * | 12/1994 | McCall et al. | 180/13 |
| 5,657,828 | A | * | 8/1997 | Nagamachi | 180/19.3 |
| 6,276,470 | B1 | * | 8/2001 | Andreae, Jr. et al. | 180/19.3 |

* cited by examiner

Primary Examiner—A. Lerner
(74) Attorney, Agent, or Firm—Andrus, Sceales, Starke & Sawall, LLP

(57) ABSTRACT

A powered golf caddy vehicle permits a single golfer to conveniently control the speed and direction of travel during a round of golf while following the vehicle. Steering and throttle control functions are merged on a single steering tiller arm.

33 Claims, 7 Drawing Sheets

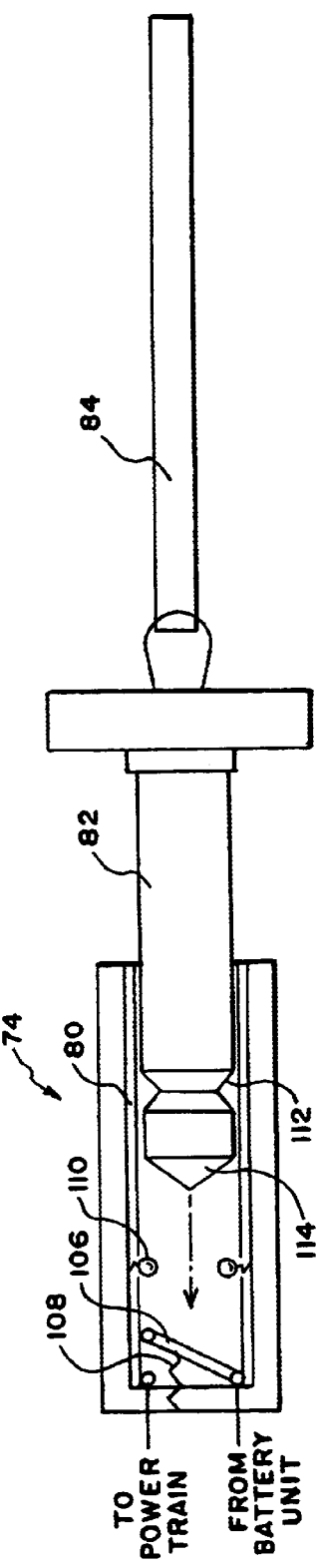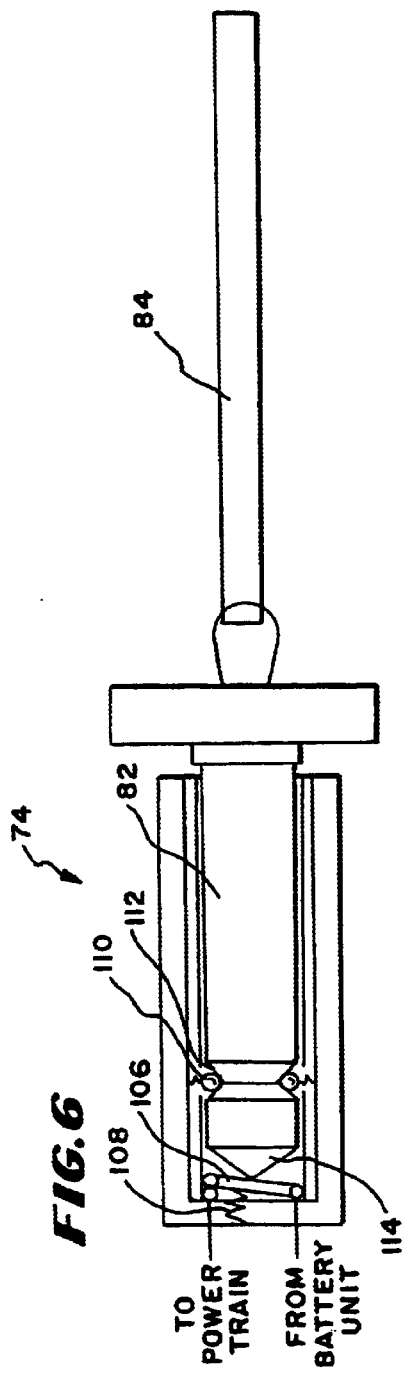

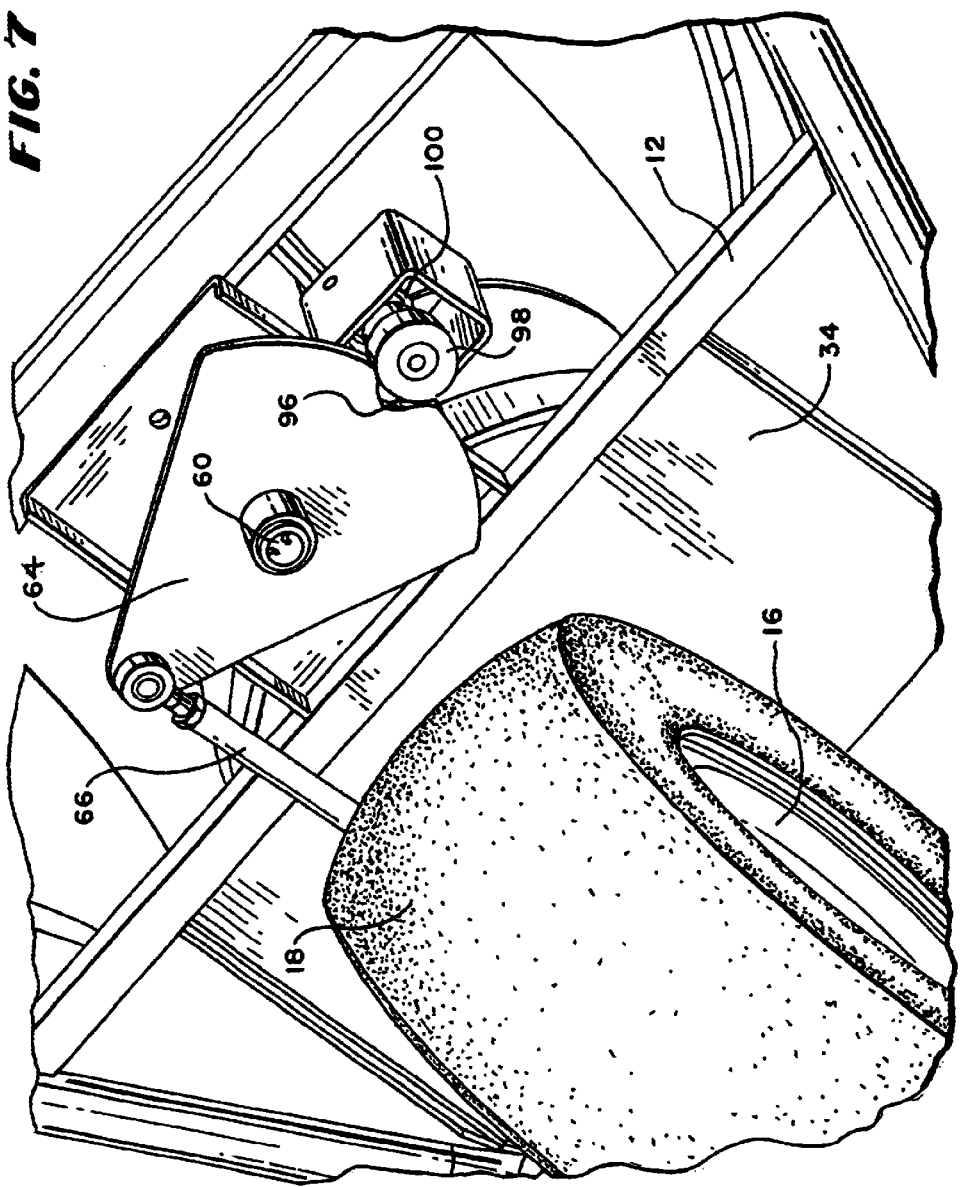

POWERED GOLF CADDY VEHICLE

FIELD OF THE INVENTION

The invention is directed to golf carts and other forms of small, powered vehicles.

BACKGROUND OF THE INVENTION

The conventional configuration of powered golf carts, in which two or more golfers share the cart during a round of golf, has taken golf away from the way it was meant to be played, during which each player followed their own ball from the tee to the green. The pace of play suffers by the waiting and watching that occurs when two or more golfers share a cart.

Since 1989, the compound annual growth in the core golfer population has been only 0.4%. The single largest contributing factor to this stagnation is the pace of play. Simply put, with conventional technology, it takes too long to play a round of golf.

SUMMARY OF THE INVENTION

The invention provides a powered golf caddy vehicle that allows each player to follow their own shot from tee to green. The caddy vehicle improves the pace of play by eliminating the waiting and watching that occurs when two or more golfers share a cart. The caddy vehicle brings golf back to the way it was meant to be played: one golfer-one ball, from tee to green.

According to the various aspects of the invention, the caddy vehicle permits a single golfer to conveniently control the speed and direction of travel during a round of golf while following the vehicle. The steering function and throttle control function are merged on a single steering tiller arm. In one embodiment, the steering function includes a "track-straight" feature, that normally keeps the vehicle in a straight-ahead path of travel in the absence of an operator-applied steering force, even when the vehicle is traveling against the grain of a hill. Hands-free cruise control is thereby enabled. In one embodiment, the throttle control function enables the quick selection of a momentary, hands-on control mode or a hands-free cruise control mode, along with selection of forward or reverse propulsion directions and speed. In one embodiment, a power key tethered to the operator can quickly shut down power to halt vehicle propulsion, and also desirably engage a parking brake, should the operator fall behind or otherwise lose control of the vehicle.

Features and advantages of the inventions are set forth in the following Description and Drawings, as well as in the appended claims.

BRIEF DESCRIPTION OF THE DRAWINGS

FIGS. 5 and 6 are enlarged side section view of the power control unit that can be used in a golf caddy vehicle of a type shown in FIG. 1;

FIG. 7 is an enlarged perspective view of a portion of the front wheel steering assembly shown in FIG. 5, showing a cam plate and spring biased roller follower that bias the front steering wheel toward a "straight-ahead" path of travel.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION OF THE PREFERRED EMBODIMENTS

Figure 1:
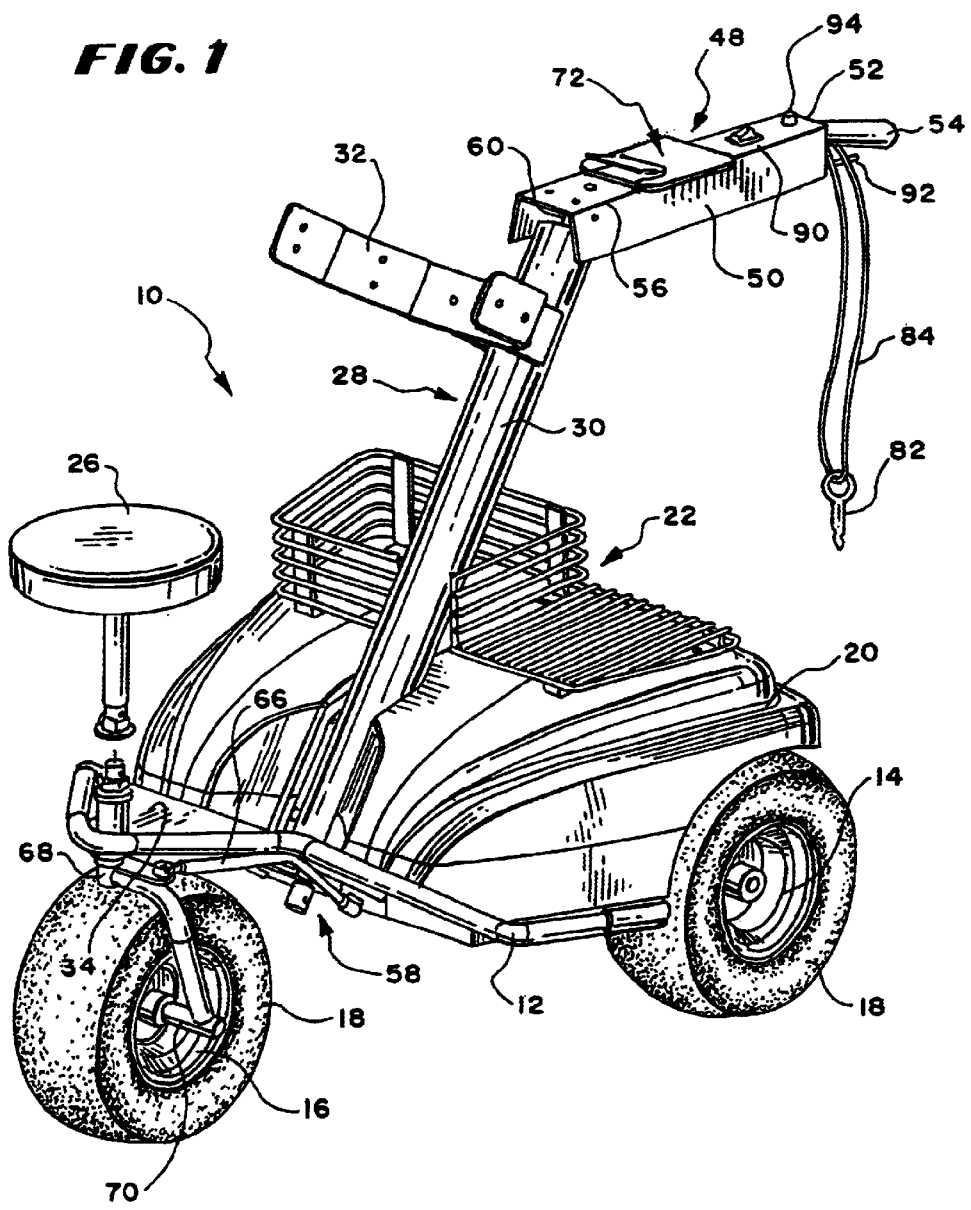
FIG. 1 is a side perspective view (partially exploded) of one embodiment of a powered golf caddy vehicle that embodies features of the invention.

FIG. 1 shows a powered golf caddy vehicle 10 that embodies features of the invention. The vehicle 10 includes a frame 12 supported on wheels 14 and 16 for movement on the ground. In the embodiment shown in FIG. 1, there are two motor-driven rear wheels 14 and a single front steering wheel 16 situated forward of and centered between the rear wheels 14. Alternatively, two front steering wheels may be provided.

As shown in FIG. 1, the vehicle 10 is intended to be operated as a "walk-behind" vehicle 10, whereby an operator controls the speed and direction of travel while following the vehicle 10. Preferably, oversized, pneumatic tires 18 are carried by the wheels 14 and 16. The inflation pressure of the tires 18 can be adjusted as needed depending upon the terrain encountered or traction desired.

The vehicle 10 includes a housing 20 carried on the frame 12. The housing 20 is desirably molded from a sturdy, yet lightweight plastic material and secured by conventional fasteners to the frame 12. The housing 20 provides a desired aesthetic appearance, while also providing a platform to mount ancillary equipment 22, such as plastic or metal frame basket(s), tray(s), cup holder(s), bottled water holder(s), and the like, to accommodate personal belongings of the operator. The housing 20 also creates a covered interior compartment to shield the drive train 24 for the rear wheels 16 (shown in phantom lines in FIG. 3), as will be described later.

Optionally (as shown in exploded view in FIG. 1), a seat 26 can be mounted on the frame 12. The operator can use the seat 26 when the vehicle 10 is not operating. In the embodiment shown in FIG. 1, the seat 26 is attached to the frame above the front steering wheel 16. Furthermore (see FIG. 3), fitments 104 can be attached to the housing 20, front and/or rear, to enable towing of the vehicle 10, alone or in tandem with other vehicles.

As FIG. 1 shows, the vehicle 10 also includes a golf bag holder 28 carried by the frame 12. In the illustrated embodiment, the golf bag holder 28 comprises a rearwardly-included post 30, against which the golf bag (not shown) can rest. A bracket 32 on the upper end of the post 30 cradles the top end of the golf bag. A releasable belt or fastener of conventional construction (not shown) can be coupled to the bracket 32, to encircle the top of the golf bag and secure the golf bag to the holder 28. The bottom end of the golf bag rests on a floor panel 34 secured to the frame 12 above the front wheel 16.

The drive train 24 for the rear wheels 14 can vary in construction. In the illustrated embodiment (see FIG. 2), the drive train 24 includes an electric motor 36. The motor 36 can comprise, e.g., a direct current, permanent magnet motor. The motor 36 is desirably powered by a rechargeable battery unit 38 also carried by the frame 12 within the housing 12. In the illustrated embodiment, the rechargeable battery unit 38 is preferably sized to accommodate extended operation of the vehicle 10 between recharges. A plug-in connector 102 in the housing 20 (see FIG. 3) allows easy connection of the battery unit 38 to a recharging circuit. As shown, the motor 36 is coupled to the rear wheels 14 by a differential gear unit 40.

In the illustrated embodiment (see FIG. 2), the drive train 24 includes a motor control circuit 42. The control circuit 42 desirably includes a motor driver device 44 coupled to a microprocessor-based controller 46. The motor driver device 44 can comprise, e.g., a conventional H-bridge/driver circuit. In this arrangement, the device 44 comprises a configuration of power switching devices (typically, transistors). The device 44 responds to prescribed control signals to apply voltage pulses to the armature and to vary the current in the armature windings of the motor 36, which cause the motor 36 to rotate the rear wheels 14 at the rate and in the direction desired by an operator. The microprocessor-based controller 46 supplies prescribed control signals to the motor driver device 44 according to rules programmed in the controller 46. The controller 46, in turn, responds to one or more analog voltage inputs, which, according to the programmed rules, cause the controller 46 to generate the control signals. A throttle interface 48 generates the analog voltage inputs for the controller 46, as will be described in greater detail later.

Alternatively, each rear wheel 16 can be independently driven by a separate motor. This arrangement could also provide motor-driven steering, by applying different speed and directional commands to the two motors.

However, in the illustrated, single motor embodiment (see FIG. 3), the vehicle 10 includes a tiller arm 50 for manually steering the front wheel 16. The tiller arm 50 includes an outboard end 52 that extends rearwardly of the golf bag holder 28 at about waist height for manipulation by an operator standing or walking behind the vehicle 10. The outboard end 52 of the tiller arm 50 carries a tiller grip 54 to facilitate single-handed control of the tiller arm 50 by the operator.

Figure 3:
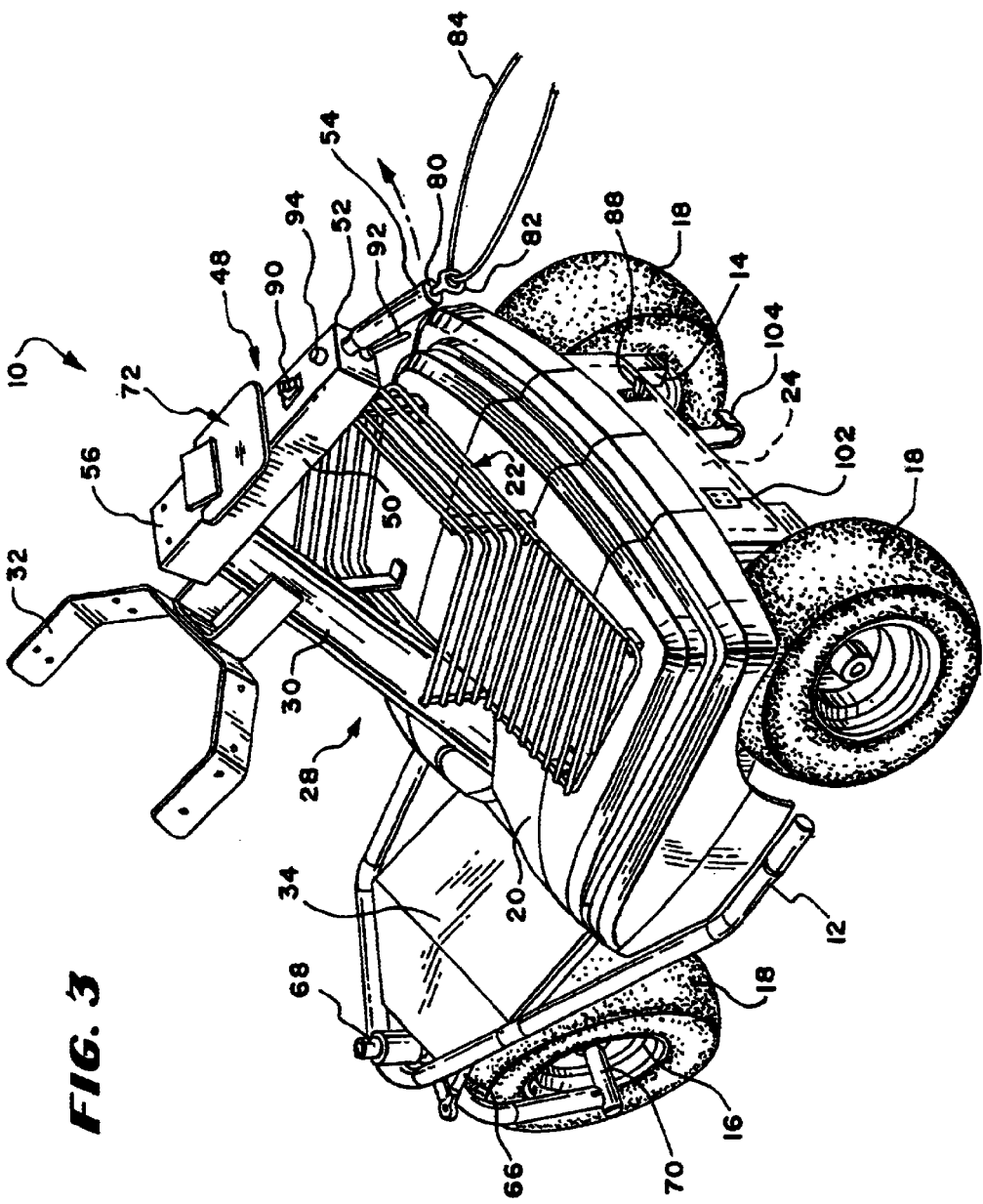
FIG. 3 is a rear perspective view of the powered golf caddy vehicle shown in FIG. 1, with the steering tiller positioned to steer the vehicle to the right.
Figure 4:
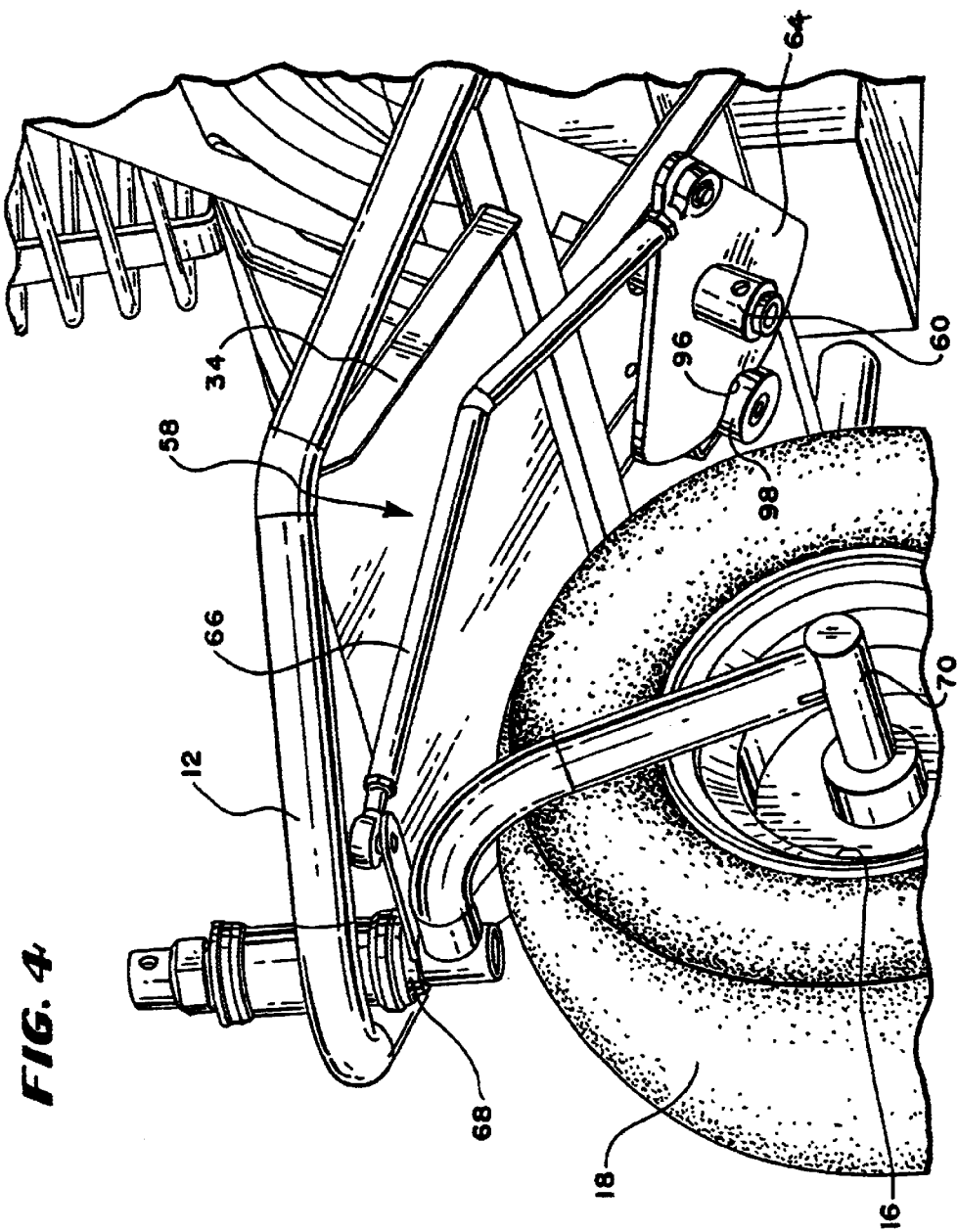
FIG. 4 is an enlarged perspective view of a portion of the front wheel steering assembly that is coupled to the steering tiller shown in FIG. 3.

The tiller arm 50 is coupled at its inboard end 56 to a steering assembly 58 (which is shown in FIGS. 3 and 4). The steering assembly 58 includes steering shaft 60. As FIG. 4 shows, the steering shaft 60 is rotationally supported in the post 30 of the golf bag holder 28. The upper end of the steering shaft 60 is coupled to the inboard end 56 of the tiller arm 50, such that side to side swinging of the outboard end 52 of the tiller arm 50 (shown by arrows 62 in FIG. 3) rotates the steering shaft 60 within the post 30.

The steering assembly 58 also includes a steering cam plate 64 (see FIG. 4), which is coupled to the lower end of the steering shaft 60 beneath the frame 12. Rotation of the steering shaft 60 rotates the cam plate 64.

As FIG. 4 also shows, the steering assembly 58 also includes a link 66, which is coupled at one end to the steering cam plate 64 and at an opposite end to a wheel castor 68. The wheel castor 68 is rotationally supported on the frame 12 and carries the axle 70 of the front wheel 16.

The axle 70 of the front wheel 16 extends transverse the rotational axis of the wheel castor 68.

The link 66 is desirably made so that its length can be adjusted. By adjusting the length of the link, the front wheel 16 can be placed in the desired straight-ahead orientation when the tiller arm 50 is in a centered steering position, as FIG. 1 shows.

In use, rotation of the steering shaft (by side-to-side swinging of the tiller arm 50, shown in FIG. 3) is translated by the steering cam plate 64 to fore and aft movement of the link 66, which, in turn, rotates the wheel castor 68 about its axis to turn the front wheel 16 left or right.

More particularly, as FIG. 3 shows, swinging the outboard end 52 of the tiller arm 50 to the left (when facing the rear of the vehicle 10) turns the front wheel 16 to the right, and the vehicle 10, when propelled forward, will turn to the right. Conversely, swinging the outboard end 52 of the tiller arm 50 to the right (when facing the rear of the vehicle 10) turns the front wheel 16 to the left, turning the vehicle 10, when propelled forward, to the left.

In the illustrated embodiment, as FIG. 3 shows, the tiller arm 50 can provide support for other auxiliary items 72 usable by the operator, e.g., a clip board or the like, to hold score cards, instructions, tees, etc.

As FIG. 3 shows, the throttle interface 48 is desirably carried on the tiller arm 50. The operator can thereby, with a single hand, control the path of movement of the vehicle 10 using the tiller arm 50, while also operating the throttle interface 48 to change the forward and backward direction of propulsion and the speed of the vehicle 10.

The throttle interface 48 can vary in construction. In the illustrated embodiment (see FIGS. 2 and 3), the throttle interface 48 includes a power control unit 74, a forward-backward propulsion control unit 76, and a propulsion speed unit 80.

The form of the power control unit 74 can vary. In the illustrated embodiment (schematically shown FIGS. 5 and 6), the power control unit 74 includes a power socket 80 carried within the tiller grip 54. The power socket 80 includes at its far end a switch 106 that is normally biased (e.g., by a spring 108) toward an electrically "opened" condition (as FIG. 5 shows). In this condition, no electrical energy is supplied by the battery unit 28 to the drive train 24.

A plug-in actuator or key 82 can be selected inserted by a pushing motion into the power socket 80 or, conversely, removed by a pulling motion from the power socket 80, as FIG. 5 also shows. When inserted fully into the power socket 80 (see FIG. 6), the far end 114 of the actuator 82 contacts the switch 106, to move the switch 106 into an electrically "closed" condition. In this condition, electrical energy is supplied by the battery unit 38 to the drive train 24. An array of spring loaded balls 110 or the like makes a snap fit engagement with a groove 112 on the actuator 82. This releasably holds the actuator 82 within the socket 80, to keep the switch 106 in an electrically closed condition during vehicle operation.

When sufficient pulling force is applied to the actuator 82, the snap fit engagement between the ball array 110 and the groove 112 is released, allowing the actuator 82 to be withdrawn from the power socket 80. In the absence of contact between the switch 106 and far end 114 of the actuator 82, the spring 108 returns the switch 106 to its normal electrically "opened" condition, and no electrical energy is supplied by the battery unit 28 to the drive train 24.

Preferably (as FIGS. 1 and 3 show), the actuator 82 is fastened to a lanyard 84 that is sized to be worn or carried by the operator of the vehicle 10. If the operator accidently loses control of the tiller arm 48 or otherwise falls behind the vehicle 10 while the vehicle 10 is moving forward, the travel of the vehicle 10 away from the operator will itself pull the actuator 82 from the power socket 80 and turn the vehicle 10 off.

Desirably, the interruption of power to the motor, occasioned by the removal of the power actuator 82 from the socket 80, also activates a solenoid activated parking brake 86 (see FIG. 2) on one or both of the rear wheels 14. Insertion of the power actuator 82 into the socket 80 to restore power to the motor automatically releases the parking brake 86. In this arrangement, a mechanical override 88 on the back of the vehicle 10 (see FIG. 3) is desirably provided to manually release the electromechanical parking brake 88 when the power actuator 82 is removed from the socket 80, to allow the vehicle 10 to be moved without power.

As shown (see FIGS. 2 and 3), the forward-backward propulsion control unit 76 comprise a toggle switch 90. Toggling the switch 90 to a first (desirably forward) position generates a voltage input to the controller 46 to generate a control signal that operates the motor 36 to provide forward propulsion (provided that the power control unit 74 is electrically closed). Conversely, toggling the switch 90 to a second (desirably rearward) position generates a voltage input to the controller 46 to generate a control signal that operates the motor 36 to provide rearward propulsion (again, provided that the power control unit 74 is electrically closed).

As shown (see FIGS. 2 and 3), the propulsion speed unit 78 comprises a multi-position switch 92 and a potentiometer 94. The multi-position switch 92 selectively enables the generation of voltage inputs to the controller 46, to generate speed commands to the motor 36. The potentiometer 94 varies the magnitude of the voltage inputs to set different speed settings.

The multi-position switch 92 desirably has a neutral position and at least one other position out of the neutral position. When in the neutral position, the switch 92 is in an electrically "opened" condition, and no voltage inputs for the controller 46 are generated. When the power control unit 74 is electrically closed, the vehicle 10 rests in a ready, but non-propelled condition.

When the power control unit 74 is electrically closed, moving the multi-position switch 92 to the other position places the switch in an electrically "on" condition. Voltage inputs for the controller 46 are generated. The motor 36 receives the resulting speed commands to propel the vehicle 10.

In this state, the position of the potentiometer 94 dictates the magnitude of the commanded speed. By rotating the potentiometer 94, the operator varies the resistance of the voltage input generating circuit, and thereby varies the magnitude of the voltage inputs received by the controller 46. According to programmed rules, the controller 46 generates motor speed control signals in proportion to the magnitude of the voltage inputs it receives.

For example, when the power control unit 74 is electrically closed, turning the potentiometer 94 clockwise progressively decreases the resistance of the circuit (increasing the voltage input), thereby commanding increases the motor 36 speed, thus increasing the speed of the vehicle 10, desirably up to a maximum allowed speed set by the controller 46. Conversely, turning the potentiometer 94 counter-clockwise progressively increases the resistance of the circuit (decreasing the voltage input), thereby commanding decreases the motor 36 speed, thus decreasing the speed of the vehicle 10, desirably down to a minimum allowable speed set by the controller 46.

Thus, by setting the potentiometer 94 (either when the vehicle 10 is at rest or in motion), the operator can establish a desired vehicle speed. The direction of rotation of motor 36 (and thus the direction of vehicle travel) is dictated by the position of the toggle switch 90, which is also set by the operator, as above described. Desirably, at a given setting of the potentiometer 94, the controller 46 is conditioned to command a lesser speed when the motor 36 is operated for backward propulsion than when the motor 36 is operated for forward propulsion.

If desired, the multi-position switch 92 can be spring biased toward the neutral position. Thus, when the power control unit 74 is electrically closed, the operator is able to cause vehicle movement by moving the switch 92 out of the neutral position (desirably in an upward direction, toward the tiller grip 54). When released, the switch 92 returns to its spring-biased neutral position, halting vehicle 10 propulsion. Momentary, hands-on, finger tip control, at a desired speed and in a desired direction, can thus be achieved. In this position, the switch 92 thereby performs an automatic momentary switch function.

Alternatively, the multi-position switch 92 can be configured without a spring bias, to maintain a position outside the neutral position until manually returned to the neutral position. This permits hands-free cruise control, at a desired speed and in a desired direction, as long as the power control unit 74 remains electrically closed. In this position, the switch 92 thereby performs a manually activated momentary switch function.

Figure 2:
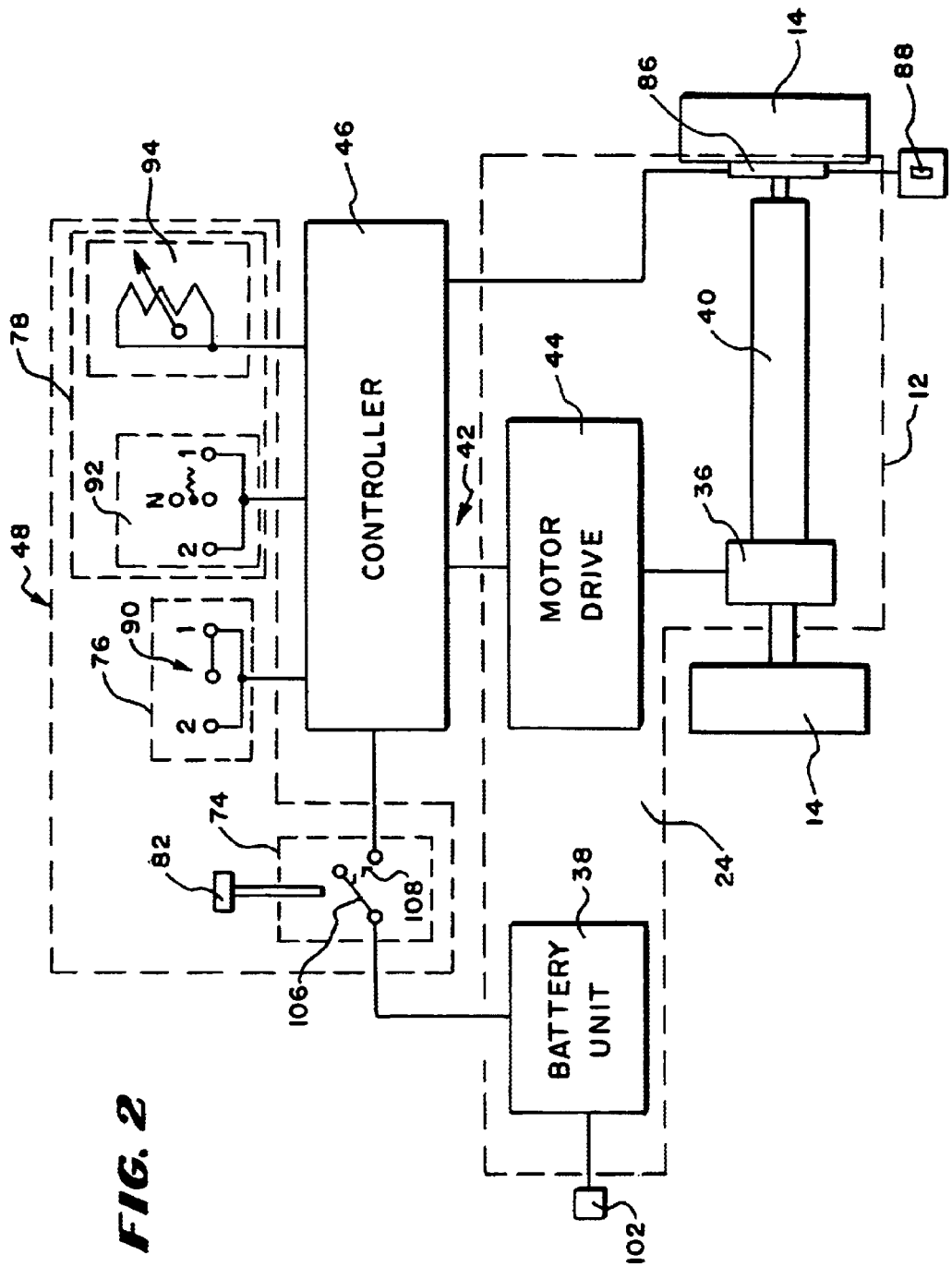
FIG. 2 is a schematic view of a power train that can be used to propel a golf caddy vehicle of a type shown in FIG. 1.

Desirably (as shown in FIG. 2), the multi-position switch 92 accommodates both momentary hands-on control and hands-free cruise control. In this arrangement, the switch 92 includes both first and second positions outside the neutral position, both of which constitute an electrically "closed" condition. The switch 92 can be spring biased toward the neutral position between the first and neutral positions (for example, in the direction out of the neutral position toward the tiller grip 54) to provide momentary, hands-on, finger tip control. The switch 92 can lack spring bias between the neutral position and the second position (for example, in the direction out of the neutral position toward the ground) to provide hands-free cruise control.

The controller 46 can be programmed to perform other various motor control functions. For example, the controller 46 can provide regenerative braking action within the motor 36. With regenerative braking, the controller 46 can maintain a desired speed when proceeding up a hill or down a hill. Vehicle acceleration parameters can also be set using the controller 46, as can maximum and minimum allowable speeds. The controller 46 can also be programmed to enable a battery conservation mode, which would regulate power consumption to conserve battery life. The battery conservation mode can be selected by the operator through use of an appropriate selection switch or button on the throttle interface 48 or elsewhere on the vehicle 10.

As another example, hands-free cruise control can include a time-out feature, which propels the vehicle 10 for a prescribed period of time and then halts propulsion. Motor RPM sensors, wheel speed sensors, and the like can also be provided to electronically provide feedback information that, when processed by the controller 46, keep the vehicle 10 and operator together. However, when operated in the momentary, hands-on mode, the pressure of the spring biased switch 92 in the hand of the operator provides significant tactile feedback, which the operator's brain can process to dictate natural voluntary muscle responses, which keep the operator and the vehicle 10 moving in synchrony, without RPM sensors, wheel speed sensors, and the like.

In the illustrated embodiment, the steering assembly 58 is balanced to normally keep the vehicle 10 steering straight in the absence of an operator-generated steering force. More particularly, the relationship between the weight (WTT) and moment arm distance (DT) of the tiller arm 50 are selected to balance its turning force moment (which can be expressed as WTT×DT) against the turning force moment due to the relationship between the weight borne by the front wheel 16 (WTW) and the moment arm distance of the wheel castor DW (the front wheel turning force moment can be expressed as WTW×DW) Thus, in the absence of an external, operator-applied turning force on the tiller arm 50, the balance of the turning force moments resists movement of the front steering wheel 16 out of its straight-ahead orientation. Even when the vehicle 10 travels across the grain of a hill in a hands-free mode, the gravity-induced turning force moment tending to move the front steering wheel 16 in a path down of the hill is counter-balanced against the gravity-induced turning force movement tending to swing the tiller arm 50 toward the down slope of the hill (thereby moving the front steering wheel 16 in a path up the hill). The balance of force moments biases the front wheel 16 toward a straight-ahead orientation.

Alone or in combination with the balancing of force moments, the steering assembly 58 can provide other forms of resistance to normally keep the front wheel 16 in a straight-ahead orientation. The steering assembly 58 can actively bias the front steering wheel castor 68 toward a position in which the front steering wheel 16 is aligned with a straight-ahead path of travel, i.e., when the path of travel of the front steering wheel 16 is generally parallel with the path of travel of the rear wheels 14, so that the vehicle 10 does not turn.

As shown in FIG. 7, the steering assembly 58 can include a detent 96 in the steering cam plate 64 that registers with and captures a follower 98 when the rotational position of the wheel castor 68 places the front steering wheel 16 in a straight-ahead path of travel. Desirably, the follower 98 comprises a roller for ease and smoothness of operation.

Figure 8:
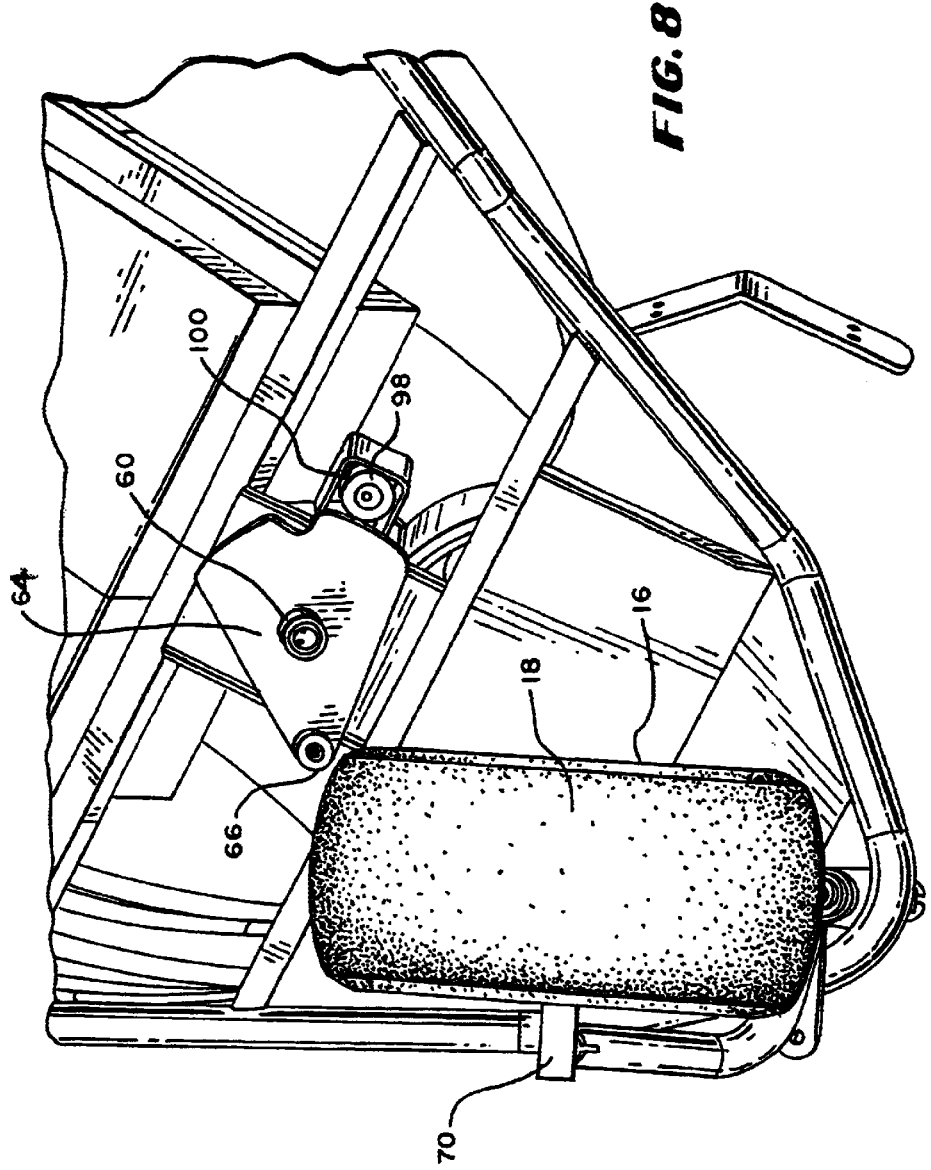
FIG. 8 is an enlarged perspective view of the portion of the front wheel steering assembly shown in FIG. 7, after an operator has applied a steering force to move the front steering wheel out of a "straight-ahead" path of travel to turn the vehicle.

A spring 100 biases the roller follower 98 toward registration within the detent 96. The spring 100 resists rotation of the steering cam plate 64 that frees the roller follower 98 from the detent 96. Thus, in hands-free operation, or otherwise in the absence of a sufficient external, turning force on the tiller arm 50, the spring biased follower 98 stays in the detent 96, and the vehicle 10 maintains a straight path of travel. However, the application of a sufficient external turning force on the tiller arm 50 by the operator will overcome the spring biasing force (see FIG. 8), freeing the follower 98 from the detent and permitting rotation of the steering cam plate 64. The resulting movement of the front steering wheel 16 out of the straight-ahead orientation turns the vehicle 10.

As the tiller arm 50 is subsequently returned by the operator toward its center position, the spring-biased follower 98 will snap into the detent 96 as soon as the straight-ahead orientation for the front wheel 16 is reached, aiding the operator in reestablishing straight-ahead travel. Due to the spring-biased follower 96, the operator is always able to tactily sense when the vehicle 10 is in a straight-ahead mode of operation and to quickly return to the straight-ahead mode when desired.

Various features of the invention are set forth in the following claims.

We claim:

1. A golf caddy vehicle comprising a chassis,
a golf bag holder carried by the chassis,
at least three wheels supporting the chassis for movement, at least one of the wheels being steerable,
a motor coupled to at least one of the wheels to propel the chassis,
a steerable element on the chassis for manual manipulation by an operator,
a mechanism coupling the steerable element to the steerable wheel to steer the wheel in response to manual manipulation of the steerable element,
a controller coupled to the motor operating to generate motor control signals in response to propulsion command inputs, and
a throttle interface carried by the steerable element for manipulation by an operator and being coupled to the controller to generate the propulsion command inputs, wherein the device includes a switch in communication with the operator during operation of the vehicle, the switch having a first position in which no propulsion command input is generated and a second position that generates a propulsion command input, the switch being movable from the second position to the first position in response to actuation of the switch by the controller when a prescribed maximum separation between the operator and the chassis exists.

2. A golf caddy vehicle according to claim 1 wherein the throttle interface includes a device to generate a propulsion command input that controls motor speed.

3. A golf caddy vehicle according to claim 1 wherein the throttle interface includes a device to generate a propulsion command input that selects a motor speed.

4. A golf caddy vehicle according to claim 3 wherein the device comprises a potentiometer operating to select a range of motor speeds.

5. A golf caddy vehicle according to claim 1 wherein the throttle interface includes a device to generate a propulsion command input that controls direction of motor operation.

6. A golf caddy vehicle according to claim 1 wherein the throttle interface includes a device to generate a propulsion command input that selects a direction of motor operation.

7. A golf caddy vehicle according to claim 6 wherein the device includes a switch having a first position that generates a forward propulsion command input and a second position that generates a rearward propulsion command input, the switch being movable between the first position to the second position in response to operator manipulation of the switch.

8. A golf caddy vehicle according to claim 1 wherein the throttle interface includes a device to generate a propulsion command input that controls power to the motor.

9. A golf caddy vehicle according to claim 8 wherein the device includes a power key insertable into a power socket on the steerable element to selectively control power to the motor.

10. A golf caddy vehicle according to claim 9 wherein the power key is adapted to be withdrawn by an operator from the power socket to interrupt power to the motor.

11. A golf caddy vehicle according to claim 10 wherein the power key is adapted to be tethered to an operator of the vehicle.

12. A golf caddy vehicle according to claim 1 wherein the throttle interface includes a device to generate a propulsion command input that controls a cruise parameter for the motor.

13. A golf caddy vehicle according to claim 1 wherein the throttle interface includes a device to generate a propulsion command input that selects a cruise parameter for the motor.

14. A golf caddy vehicle according to claim 13 wherein the cruise parameter includes momentary cruise control in response to operator manipulation of the device.

15. A golf caddy vehicle according to claim 13 wherein the cruise parameter includes cruise control without operator manipulation of the device.

16. A golf caddy vehicle according to claim 1 wherein the switch is biased toward the first position and returns from the second position toward the first position absent operator manipulation of the switch.

17. A golf caddy vehicle according to claim 1 wherein the switch includes a third position that generates a propulsion command input, the switch being movable from either the first position or the second position to the third position in response to operator manipulation of the switch.

18. A golf caddy vehicle according to claim 17 wherein, when in the third position, the switch maintains the third position absent operator manipulation of the switch.

19. A golf caddy vehicle according to claim 1 wherein the throttle interface includes a device to generate a propulsion command input that controls power to the motor, and
further including a parking brake that sets in response to absence of power to the motor and that releases in response to presence of power to the motor.

20. A golf caddy vehicle according to claim 19 wherein the device includes a power key insertable into a power socket on the steerable element to selectively control power to the motor.

21. A golf caddy vehicle according to claim 20 wherein the power key is adapted to be withdrawn by an operator from the power socket to interrupt power to the motor.

22. A golf caddy vehicle according to claim 21 wherein the power key is adapted to be tethered to an operator of the vehicle.

23. A golf caddy vehicle according to claim 1 wherein the steerable element comprises a tiller mounted on the chassis for left and right swinging movement in response to operator manipulation.

24. A golf caddy vehicle according to claim 23 wherein the tiller has weight and a moment arm, wherein the steerable wheel has weight and a turning force moment, and
wherein the weight and moment arm of the tiller and the wheel weight and turning force moment of the steerable wheel are substantially balanced to maintain a straight-ahead steering orientation absent a steering force applied by an operator to the tiller.

25. A golf caddy vehicle according to claim 24 wherein the steerable wheel is biased to maintain a straight-ahead steering orientation absent a steering force applied by an operator to the tiller.

26. A golf caddy vehicle according to claim 1 wherein the steerable wheel is biased to maintain a straight-ahead steering orientation absent a steering force applied by an operator to the steerable element.

27. A vehicle comprising
a chassis,
a steerable wheel having weight and defining a turning force moment,
a tiller on the chassis for left and right swinging movement in response to operator manipulation, the tiller having weight and a moment arm,
a mechanism coupling the tiller to the steerable wheel to steer the wheel in response to left and right swinging movement of the tiller, the weight and moment arm of the tiller and the weight and turning force moment of the steerable wheel being substantially balanced to maintain a straight-ahead steering orientation for the steerable wheel absent a steering force applied by an operator to the tiller.

28. A vehicle according to claim 27 wherein the steerable wheel is biased to maintain the straight-ahead steering orientation absent a steering force applied by an operator to the tiller.

29. A vehicle according to claim 27 further including a motor coupled to a wheel to propel the chassis.

30. A vehicle according to claim 29 further including a controller coupled to the motor operating to generate motor control signals in response to propulsion command inputs, and
a throttle interface carried by the tiller for manipulation by an operator and being coupled to the controller to generate the propulsion command inputs.

31. A vehicle according to claim 29 further including a parking brake that sets in response to absence of power to the motor and that releases in response to presence of power to the motor.

32. A golf caddy vehicle comprising
a chassis,
a golf bag holder carried by the chassis,
at least three wheels supporting the chassis for movement,
a motor coupled to at least one of the wheels to propel the chassis,
a controller coupled to the motor operating to generate motor control signals in response to propulsion command inputs, and
a throttle interface on the chassis including a power socket and a power key insertable into the power socket to supply power to the motor, the power key being adapted to be withdrawn from the power socket to interrupt power to the motor, the power key being carried by a lanyard to tether the power key to an operator of the vehicle while the power key is inserted in the power socket and being sized to withdraw the power key from the socket when a prescribed maximum separation between the operator and the chassis exists.

33. A golf caddy vehicle according to claim 32 further including a parking brake that sets in response to absence of power to the motor and that releases in response to presence of power to the motor.

* * * * *